US006304670B1

(12) United States Patent
Berestov

(10) Patent No.: US 6,304,670 B1
(45) Date of Patent: Oct. 16, 2001

(54) COLORATION AND DISPLAY OF DATA MATRICES

(75) Inventor: Alexander Berestov, Campbell, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/112,704

(22) Filed: Jul. 8, 1998

(51) Int. Cl.[7] .......... G06K 9/00
(52) U.S. Cl. .......... 382/162; 382/166
(58) Field of Search .......... 382/162, 166, 382/106; 358/518, 521, 527, 530; 345/430, 199, 431, 432, 147, 150, 153; 348/34

(56) References Cited

U.S. PATENT DOCUMENTS 4,998,165 * 3/1991 Lindstrom .......... 382/128
5,182,639 * 1/1993 Jutamulia et al. .......... 348/34
5,854,620 * 12/1998 Mills et al. .......... 345/153

OTHER PUBLICATIONS

R.C. Gonzalez, R.E.Woods, "Digital image processing", Adison–Wesley Publishing Company, 1992, pp. 237–245, Plates VI and VII.*

* cited by examiner

*Primary Examiner*—Phuoc Tran
(74) *Attorney, Agent, or Firm*—Fenwick & West LLP

(57) ABSTRACT

Enables the dynamic mapping of color vectors to numeric data. Values or value ranges split a data set stored in a matrix into intervals. The intervals are assigned corresponding color vectors that are used to define the color vector calculated for each of the data points that fall within the intervals. The intervals also serve to filter out unwanted information from the matrix. The function used to calculate the color vectors assigned to the data points may also vary based on the type of data being analyzed. The color vectors calculated for the data points are stored in a color matrix and the vectors may be further mapped to an image file in accordance with provided mapping information.

14 Claims, 6 Drawing Sheets

(1 of 6 Drawing Sheet(s) Filed in Color)

COLORATION AND DISPLAY OF DATA MATRICES

TECHNICAL FIELD

This invention pertains to the field of data visualization and analysis. More specifically, the invention pertains to creating images from data stored in two-dimensional matrices.

BACKGROUND ART

Numeric data is often not conducive to direct analysis. In order to simplify the data analysis, charts and graphs are used to visually describe the data. Other methods have also been used to visually describe data including data coloration.

Data coloration is a process that maps colors to data points in order to provide a concise visual description of the data. The process is initiated by selecting a set of colors to be used in the image. The sets of colors used in these operations are called colormaps and standard applications allow a user to select among several different maps. Once the colormap has been selected, the software matches each of the data points to one of the colors in the color map. The data can then be displayed as a color image with each matrix entry represented by a colored area in the image.

It is often the case, however, that there are more data points than colors in the colormap, necessitating the mapping of several data points to a single color. Using the standard method, matrix entries with close data values will be mapped to the same or similar color, making it difficult to differentiate between the points very accurately. Additionally, the standard method fails to focus on the most important matrix entries, as each of the entries are treated equally. This prevents selective viewing of matrix values as necessitated by many forms of analysis.

In order to alleviate this problem, a method is needed that enables dynamic color mapping and display of numeric data. The method would ideally enable a user to select the most important data values while providing visual clarity between data points with similar values.

DISCLOSURE OF INVENTION

The present invention is a method for coloration and display of matrices. The data in a matrix (100) is parsed into intervals based on interval values (220, 230, 330, 340) retrieved from matrix coloration parameters (120). The interval values are further assigned color vectors (240, 250, 260) retrieved from matrix coloration parameters (120). Each matrix entry (210) in an interval is colored by an image processor (110) using the interval values (220, 230, 330, 340) and the related color vectors (240, 250, 260). The resulting revised matrix (130) is mapped to an image file (140) using data stored in an image map (150).

BRIEF DESCRIPTION OF THE DRAWINGS

The file of this patent contains at least one drawing executed in color. Copies of this patent with color drawings will be provided by the Patent and Trademark Office upon request and payment of the necessary fee. Detailed and specific objects and features of the present invention are more fully disclosed in the following specification, reference being had to the accompanying drawings, in which.

DETAILED DESCRIPTION OF THE PREFERRED EMBODIMENTS

Figure 1:
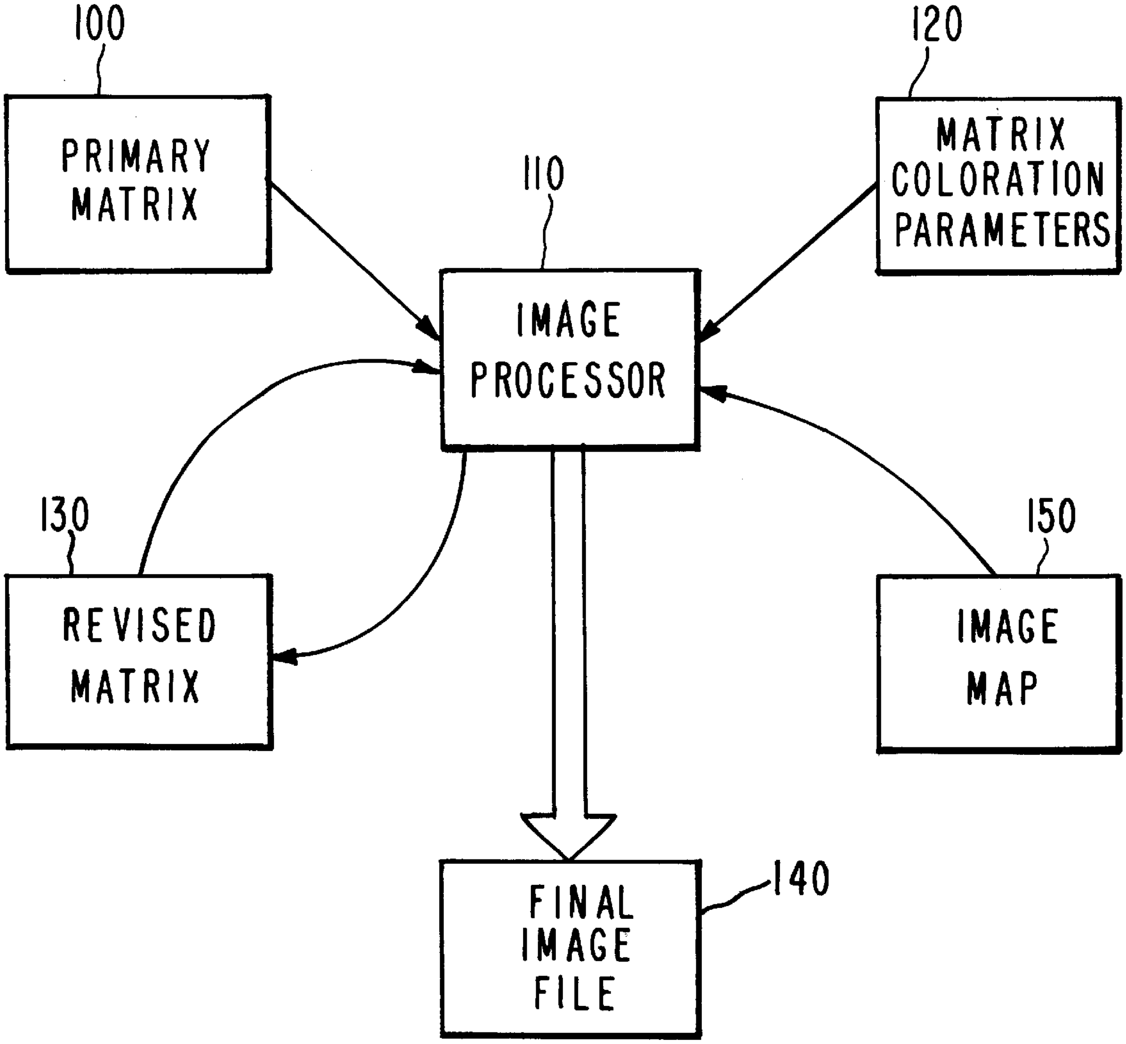
FIG. 1 is a simplified block diagram that provides an overview of the present invention.

The present invention can be run on any system that includes a processor and a storage medium. The specification describes the method as being performed in conjunction with a standard personal computer, for purposes of illustration only.

The growing use and adoption of information technology has led to an explosion in the amount of data that is collected and stored. However, collecting and storing this data would serve little purpose if the data cannot be analyzed in a meaningful fashion. This has led to an increase in the importance of data analysis tools. A number of software applications, such as Matlab® by MathWorks, Inc., provide analysis tools such as data visualization tools. Data visualization tools create images enabling rapid testing and exploring of new ideas. Unfortunately, the data visualization tools available in these applications fail to provide the power and flexibility required by today's users.

The present invention provides a flexible and powerful method for transforming a matrix containing data values into a color image while still insuring smooth color transitions between data points. A block diagram illustrating the primary components used in this method is provided in FIG. 1. The components include a primary matrix 100 (hereinafter "matrix"), matrix coloration parameters 120, an image processor 110, a revised matrix 130 and an image map 150. A final image file 140 will be created as a result of the method.

Referring now to FIG. 1, a matrix 100 storing data values is shown. The data values stored in the matrix 100 can be numeric data or any other types of data represented in a form suitable for processing by computer. In the preferred embodiment, the matrix 100 will contain numeric data in the form of real numbers and each matrix entry will contain only one number. Alternatively, the matrix 100 could store integers, vectors, names, characters or other forms of data that can be manipulated and ordered by the image processor 110.

Studies in the field of stereo imaging generate data matrices with real number values. Stereo imaging uses images taken from two or more different viewpoints to capture information, such as size of the objects in the image and distance of the objects from the image capture device. A matrix containing distance values, for instance, would result from using stereo imaging processes to map distances between the image capture device and a set of objects in an image. Each portion of the captured image would be correlated to an entry in the matrix. The distance between the image capture device and the object in a portion of the image would be stored in the appropriate matrix entry mapped to that portion of the image. The matrix would represent a numeric "snapshot" of the image at that time.

The matrix created by this process is not particularly useful, however, if the data is so voluminous that it cannot be visualized. One technique used to visualize this type of information is data coloration. Data coloration uses data values stored in a matrix to determine the color of a pixel or patch of an image that is directly correlated with the matrix. This permits easier identification of the regions of the matrix that have relatively smaller or larger values.

In order to perform data coloration, software applications, such as Matlab®, construct colormaps that can be mapped to the data points. A colormap is an m-by-3 matrix of numbers wherein each row of the colormap is a vector having red, green, and blue coordinates. Each vector defines one color and the colormap contains a total of m colors. When colorizing data using a colormap, the software application searches for the lowest and highest data values in the matrix. The lowest value is assigned the first color of the colormap and the highest value is assigned the last color in the map. All of the intermediate values are assigned to a color that most closely approximates their position between the lowest and highest value. A value that falls directly between the highest and lowest values, for instance, would be assigned to the color that falls in the middle of the colormap.

This method of data coloration is simple yet very inflexible. In order to alleviate the inflexibility associated with this process, the present invention uses matrix coloration parameters 120 to enable the dynamic assignment of color vectors to matrix entries. In the preferred embodiment, the coloration parameters 120 are stored in a data file coupled to the processor 110. Alternatively, the coloration parameters 120 can be entered by a user using a standard input device such as a keyboard or a mouse. Whether entered by the user or retrieved in a file, the coloration parameters 120 comprise a listing of matrix entry properties, such as the value of the data contained in the entry, and a color vector that will be assigned to that property.

For example, a process in the field of stereo imaging could create a matrix storing distance values. If the user wants to identify objects that are more than five feet away, the coloration parameters 120 could specify that every matrix entry with a value greater than five will be black, and every matrix entry with a value less than five will be white. If the user wants to see only those objects that are five feet away in the lower half of the image, the coloration parameters 120 could use location of the entry within the matrix as a second qualifier in the coloration scheme. Other properties that may be listed in the coloration parameters 120 include: the positional coordinates of the entry within the matrix; the rank of a matrix entry, relative to other matrix entries, when arrayed according to value; or even the value of a matrix entry after being recalculated using an equation provided in the coloration parameters.

Once the coloration parameters 120 have been retrieved, an image processor 110 colors the matrix data. In the preferred embodiment, the image processor 110 is a computer processor on a personal computer. Alternatively, any processor that can manipulate data files and calculate vector coordinates may be used. The image processor 110 retrieves the matrix 100 and calculates color vectors for each matrix entry as specified by the coloration parameters 120. Each of the color vectors calculated for the matrix entries is stored in the revised matrix 130. In the preferred embodiment, the revised matrix 130 is stored as a computer data file and indexed accordingly. Alternatively, the revised matrix 130 may be stored as an image file with the same dimensions as the original matrix. In that case, the image file stores the color vector calculated for a matrix entry in the same location in the revised matrix 130 as the location of the matrix entry in the primary matrix 100. Each of the color vectors colors a corresponding area in the resulting image file.

Once the revised matrix 130 has been created, the processor 110 retrieves the image map 150. In the preferred embodiment, the image map 150 is retrieved from a computer file containing image mapping data. Alternatively, the image map 150 may be retrieved from an input device such as a computer keyboard or mouse. The mapping data provided in the image map 150 could map only particular values stored in the revised matrix or could map an image location for every matrix entry. For instance, the image map 150 could map each row of the revised matrix 130 to a different column in the final image. An example of an image map that performs only a partial mapping is an image map 150 that mapped only those color vectors having a non-zero blue color vector coordinate.

Furthermore, the image map 150 may provide the image location for a set of entries based on further criteria. For example, a secondary calculation could be performed on the matrix data prior to final mapping. For each revised matrix entry that is mapped to a portion or pixel of the final image, the color vector stored in that entry is placed in the appropriate portion of the final image file 140. The processor 110 continues processing the revised matrix entries until the final image file 140 is complete. The final image 140 may be stored or transmitted to an output device.

Figure 2:
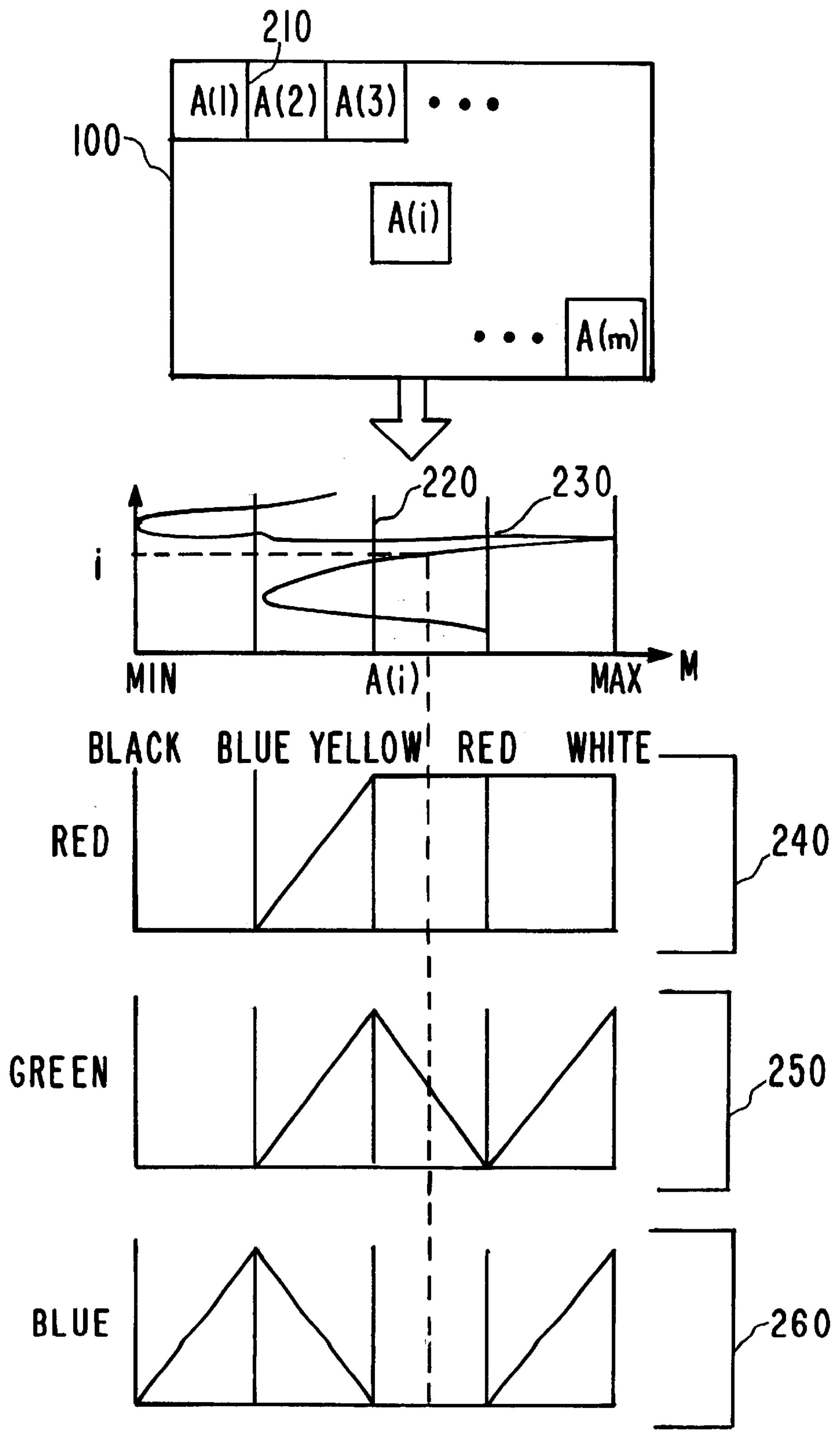
FIG. 2 is an illustration of a matrix and coloration data, showing color vectors being calculated for matrix entries based on the value stored in the matrix entry in accordance with the coloration data as disclosed by the present invention.

Referring now to FIG. 2, an illustration of a matrix 100 being interpolated using the values of entries in the matrix is shown. The processor 110 begins the data interpolation process by retrieving the matrix coloration parameters 120. In the preferred embodiment, the coloration parameters 120 are stored in a data file coupled to the image processor 110. Alternatively, the coloration parameters 120 may be entered by a user using a standard input device such as a computer keyboard or mouse.

The matrix coloration parameters 120 comprise interval values and color vectors assigned to the interval values. The processor 110 initially retrieves the interval values contained in the coloration parameters 120 and parses the matrix 100 into intervals. Each interval is created by two interval values, an interval value that demarcates the leading edge of the interval and an interval value that demarcates the trailing edge of the interval. In the preferred embodiment, the interval values are real numbers and the intervals span a range of number values. Alternatively, the interval values may comprise vectors, integers, letters, names or any other parameters that can be ordered. Furthermore, the intervals may span the entire range of values found in the matrix or may cover only a small portion of the values in the matrix.

The processor 110 retrieves the color vectors from the matrix coloration parameters 120 for each of the interval values used to create the interval edges. Each interval edge is assigned a color vector comprising red coordinates 240, green coordinates 250, and blue coordinates 260. Although the colors red, green and blue are standard color vector coordinates, other color coordinate systems including cyan-magenta-yellow (CMY) or hue-saturation-brightness (HSB)

may also be used to create the color vectors. In FIG. 2, the coloration parameters 120 specify that the minimum value is assigned the black color vector and the maximum value is assigned white color vector. The intermediate interval edges have been assigned the blue, yellow and red color vectors respectively.

After the intervals have been created and each edge assigned a color vector, the processor 110 retrieves a matrix entry 210 and determines whether the retrieved entry 210 falls into one of the intervals. If the matrix entry 210 does not fall within one of the intervals, the entry 210 is ignored and the next entry 210 is retrieved by the processor 110. If the matrix entry 210 does fall in one of the intervals, the processor 110 retrieves the color vectors assigned to the leading and trailing edge of the interval and interpolates a color vector for the matrix entry 210. In the simplest case, the vector is calculated using linear interpolation.

In this example, the processor 110 retrieves the entry A(i). As FIG. 2 illustrates, A(i) falls between the trailing edge 220, and the leading edge 230 of the third interval. Furthermore, the trailing edge 220 has been assigned the yellow color vector and leading edge 230 has been assigned the red color vector, so the color vector calculated for A(i) will fall somewhere between the yellow and red color vectors. Assuming that linear interpolation is used, the new color vector is calculated using the following equation.:

{Color coordinates of the trailing edge}+[(color coordinates of leading edge)−(Color coordinates of trailing edge)]×[(A(i)−the value of the trailing edge)/(the value of the leading edge−the value of the trailing edge)]

Yellow is comprised of the color vector coordinates (255, 255, 0) and red is comprised of the color vector coordinates (255, 0, 0). For illustration purposes, assume that the interval value of the trailing edge is 5, the interval value of leading edge is 10, and A(i) is assigned the value of 7. Using these values in the equation, the solution for the color vector of A(i) becomes:

$$(255,255,0)+[(255,0,0)-(255,255,0)*[(7-5)/(10-5)]=(255,255,0)+[(0,-255,0)*0.4]=(255,255,0)+(0,-102,0)=(255,153,0)$$

This process is repeated for each matrix entry 210 that falls within one of the intervals. The calculated color vectors for each of the entries are stored in the revised matrix 130. Furthermore, the revised matrix 130 may be mapped to a final image file 140 as described above. Once the final image file 140 is complete, the image processor 110 may perform an addition filtering step. In some cases, such as when the present invention is used in the context of stereo imaging, the color values of an area of the image should not significantly deviate from the surrounding pixels. These deviations may be caused by calculation errors or problems with the input device used to create the primary matrix 100. In order to account for these errors, the image processor 110 scans the revised matrix 130 or final image file 140 and will reassign a color vector to the matrix that more closely approximates the appropriate color. A deviation value is also provided in the matrix coloration parameters that enables the processor to assess whether a particular revised matrix entry is outside of the appropriate range. If so, the processor calculates a new color vector for the entry. The correction may be made to the primary matrix entry, resulting in a revised value in the revised matrix entry as well, or the correction may be made to color vector stored in the revised matrix entry only. Again, the matrix coloration parameters 120 will provide the necessary indicator as to whether the primary matrix entry or revised matrix entry should be corrected. The correction is performed by changing the matrix entry to accommodate the deviation value. The deviation value may be a range or an absolute value. For instance, assume that the matrix coloration parameters 120 specify that the filtering will apply to the primary matrix entry value and the deviation value is a range of two. If a particular matrix entry has a value of nine while the surrounding matrix entry values are five or below, then the matrix entry will be reduced to seven (five plus or minus 2) to place the entry within the deviation range. Alternatively, the deviation value may be have a value of seven. Therefore, any values that exceed seven will be ignored by the filter. A new value, replacing the deviant value, is calculated based on the average of each of the entries surrounding the deviant value. Thus, any impurities are further removed. Although the filtering process is described as occurring after the revised matrix 130 has been calculated, the filtering may be performed at any stage of the process.

Figure 3:
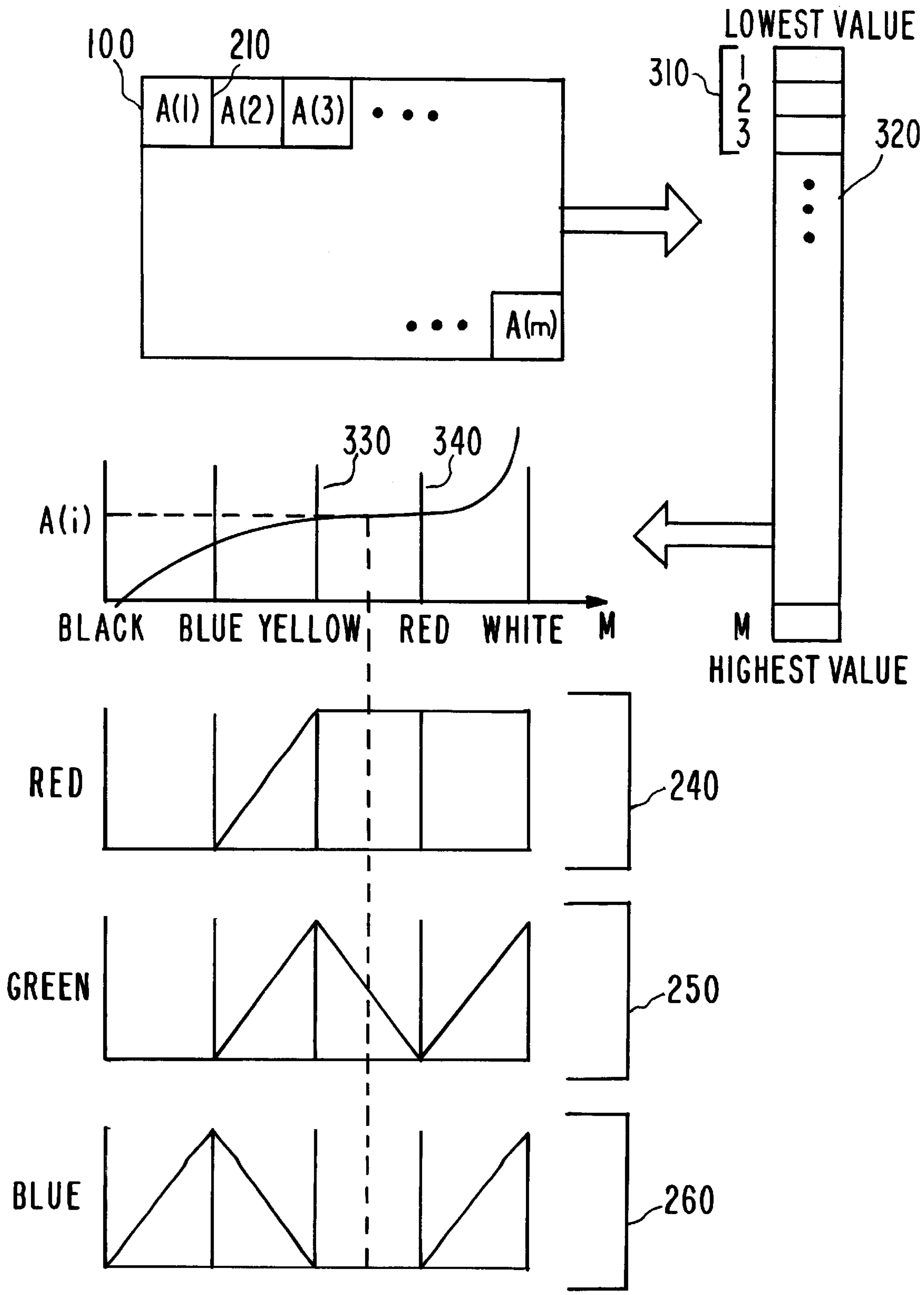
FIG. 3 also illustrates a matrix and coloration data, showing a matrix being interpolated using an ascending array of entries in the matrix as disclosed by the present invention.

FIG. 3 illustrates a matrix 100 being interpolated using the location of a matrix value 210 in an ordered array 320. Rather than coloring matrix entries 210 according to absolute value, this method calculates the color vector of a matrix entry based on the value of the matrix entry 210 relative to other matrix entries 210. This method is useful when attempting to identify the relatively smaller or larger values in a matrix 100 while insuring smooth color transitions between matrix entries 210. This method is also useful when the relative sizes of the entries are known but the specific values of the entries are not known. For example, a user might only be interested in the intermediate values stored in the matrix 100. Rather than attempting to locate particular numeric values, the user could split the matrix 100 into twenty intervals and color intervals eight through twelve while ignoring the remaining intervals.

As in the process described in FIG. 2 (above), an image processor 110 is used to perform the interpolation method. In the illustrated embodiment, the image processor 110 is a processor of a desktop computer. The processor 110 begins the interpolation process by retrieving the matrix coloration parameters 120. In the preferred embodiment, the coloration parameters 120 are stored in a data file coupled to the processor 110. Alternatively, the coloration parameters 120 can be entered by a user using a standard input device such as a computer keyboard or mouse.

The matrix coloration parameters 120 specify the property of the matrix entries that will be used in the ordering (the "ordering property") and whether entries 210 are to be ordered in an ascending or descending fashion. For simplification, it will be assumed that the coloration parameters 120 specify that the entries 210 will be ordered in an ascending fashion. The processor 110 orders the matrix entries 210 according to the ordering property and creates an ascending array 320 such that each matrix entry 210 has a corresponding array address value 310. In the illustrated embodiment, the values stored in the matrix entries are real numbers and the ordering of the matrix is performed by directly comparing the values of the matrix entries. Alternatively, the matrix entries 210 may be ordered according to a different ordering property. This insures that entries containing data that is not directly comparable can be ordered. For example, if the matrix entries contain vectors, the ordering property might specify that the matrix entries will be ordered using a particular coordinate value of the vector or the absolute value of the coordinate values of the vector.

The coloration parameters 120 further comprise interval values and color vectors. The processor 110 uses interval values contained in the coloration parameters 120 to parse the matrix 100 into intervals. As explained above with reference to FIG. 2, each interval is created by two values, a value that demarcates the leading edge of the interval 340 and a value that creates the trailing edge of the interval 330. In the preferred embodiment, the interval values are integers that can be correlated with the array addresses 310 of the ordered matrix entries. The intervals may span the entire range or may cover only a small portion of the matrix entries stored in the array 320. In the present example illustrated in FIG. 3, each of the four intervals correspond to one quarter of the index entries so each matrix entry will fall within one of the intervals. The interval edges are assigned a particular array address 310 that most closely approximates the next quarter of the array.

The interval edges are further assigned a color vector comprising red coordinates 240, green coordinates 250, and blue coordinates 260. Although red, green and blue are standard color vector coordinates, other colors or color coordinate systems may also be used to create the color vector. In FIG. 3, the first entry of the ordered array 320 is assigned the black color vector and the last entry in the ordered array is assigned the white color vector. The edges corresponding to the intervals marking the first quarter, the second quarter and the third quarter of the ordered values have been assigned the blue, yellow and red color vectors respectively.

After the intervals have been created, the processor 110 interpolates a color vector to each of the matrix entries 210. The color vectors can be interpolated using two different procedures. In the preferred embodiment, the processor 110 retrieves the array addresses 310 and color vectors of the leading edge 340 and trailing edge 330 of the interval. The processor 110 uses these values, along with the array address of the matrix entry 310, and interpolates a new color vector for the matrix entry 210. Alternatively, the processor 110 may use the values stored in the respective matrix entries, rather than the array addresses 310, to calculate the new color vector. The processor 110 calculates the color vector for a matrix entry 210 using the same interpolation calculation as described in FIG. 2. This process is repeated for each matrix entry 210 in the matrix 100. The calculated color vectors of each of the entries are stored in the revised matrix 130. The filtering step described above with reference to FIG. 2, may also be performed on the resulting data is errors are anticipated. Additional matrix coloration parameters 120 are provided accordingly.

Figure 4:
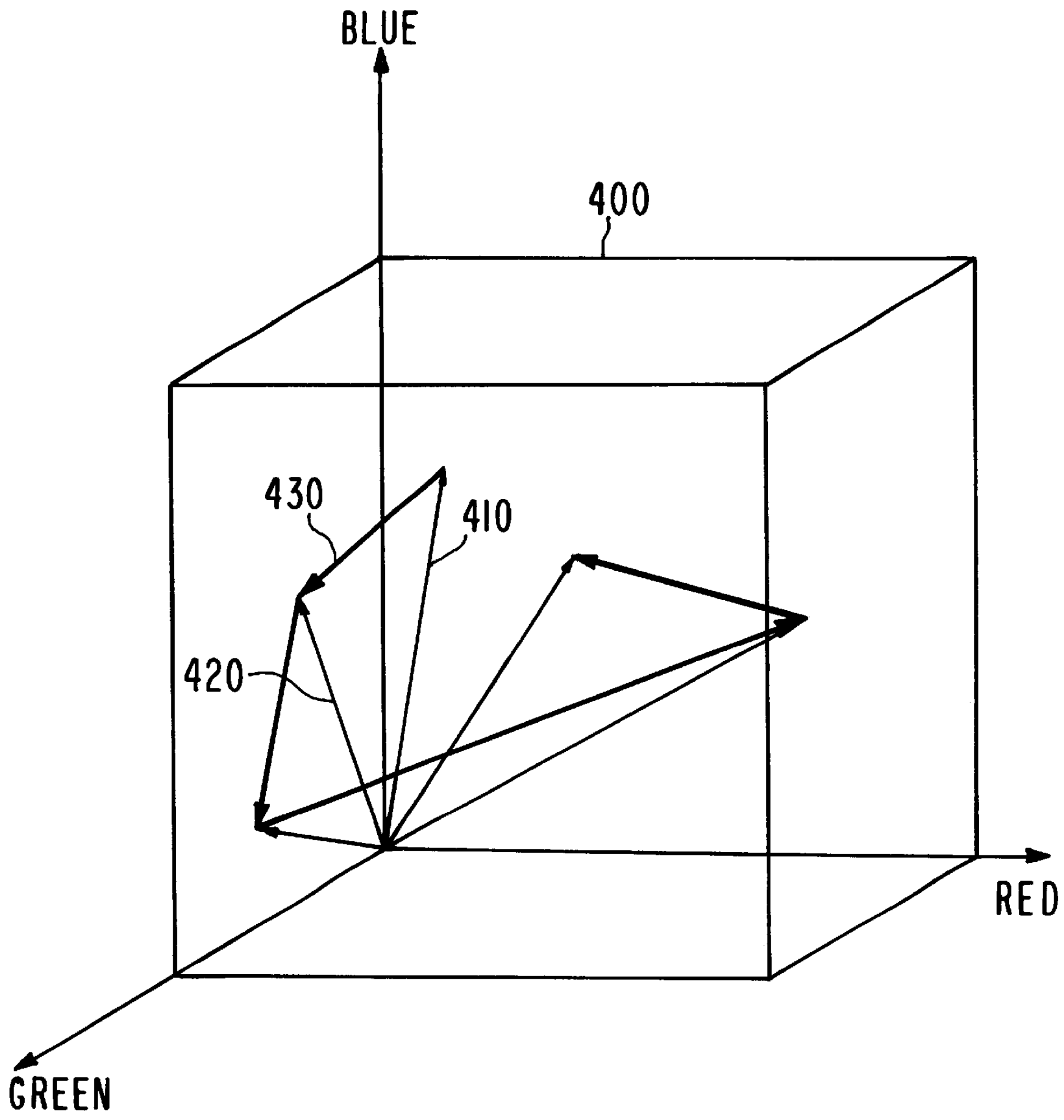
FIG. 4 is an illustration of a colorspace cube, showing the movement from one interval to another using the present invention.

Referring now to FIG. 4, an illustration of a colorspace cube 400 is shown. The colorspace cube (hereinafter "cube") 400 includes every possible color that can be generated on a standard personal computer. As explained above with reference to FIG. 1, standard software applications that perform data coloration provide a set of colors, called colormaps, that can are used by the application to color the data. A standard colormap, such as the ones used in Matlab®, usually provide as many as 40 colors in a color map. The present invention is not limited in this fashion and every color in the cube, approximately 16 million colors, can be used to color the data.

For illustration purposes, the color vectors assigned to an interval edge 410, 420 have been mapped into the cube 400. Each matrix entry that falls between the interval edges will have a color vector that falls on the line 430 connecting the end points of the color vector of the trailing edge 410 and the color vector of the leading edge 420.

Using the standard method, only points in the colorspace cube are used, resulting in several matrix entries being mapped to the same color point. As long as the lines connecting the color vectors do not cross at any point, the present invention guarantees that matrix entries 210 with different values will be mapped to a unique color vector. The Figure further illustrates the smooth color transition between the color vectors calculated for the matrix entries. The transition is particularly smooth when the matrix entries 210 are ordered in an array 320 and the array addresses 310 are used for interpolating the color vector for the matrix entry, as each entry is evenly mapped across the line 430.

Figure 5:
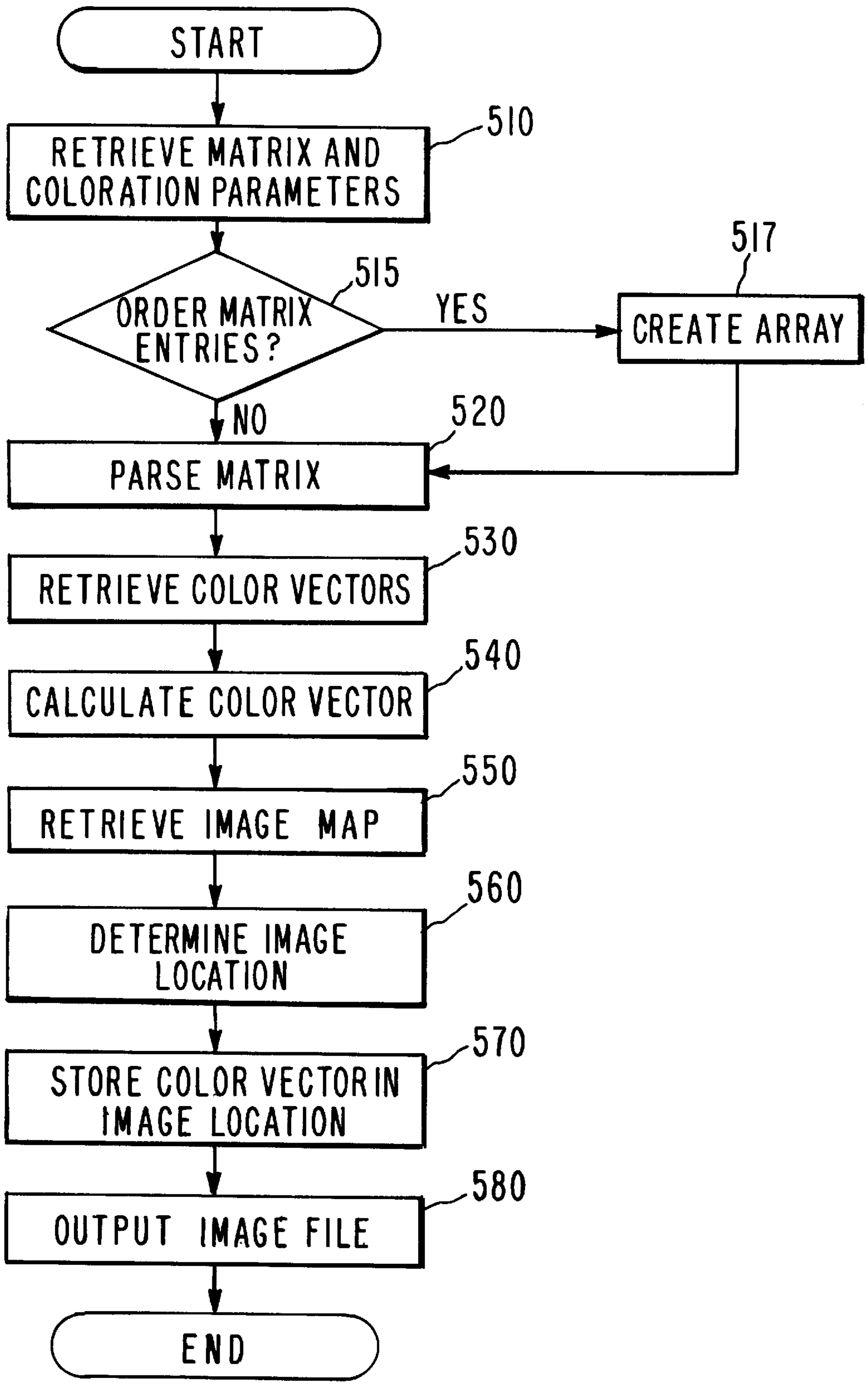
FIG. 5 is a flowchart diagram illustrating the process of the present invention.

Referring now to FIG. 5, a flowchart diagram illustrating the process 500 of the present invention is shown. The process 500 begins in step 510 when the processor 110 retrieves the matrix 100 and coloration parameters 120. In the illustrated embodiment, the matrix 100 and coloration parameters 120 are stored in a computer file coupled to the processor 110. Alternatively, the data can be retrieved using a standard input device such as a computer mouse or keyboard. In step 515, the processor 110 determines whether the coloration parameters 120 call for an ordering of the matrix entries 210. If the coloration parameters 120 require an ordering of the matrix, the processor 110 in step 517 creates an ordered array 310. In step 520, the processor 110 parses the matrix into intervals as defined by the coloration parameters 120. Each interval is created by two interval values, an interval value that demarcates the leading edge and an interval value that demarcates the trailing edge of the interval. In step 530, the processor 110 retrieves the color vectors for each of the interval edges. The color vectors comprise red, green, and blue color coordinates and are assigned to the interval edges. The processor 110 in step 540 uses the intervals and the color vectors assigned to those intervals to calculate a color vector for every matrix entry 210 that falls within an interval. Depending on the coloration parameters 120 retrieved, the color vector calculations are performed as described with reference to FIGS. 2 and 3 (above).

Once the color vectors have been calculated, the processor 110 in step 550 retrieves an image map 150. In the preferred embodiment, the image map 150 is retrieved from a computer file, coupled to the processor 110, containing image mapping data. Alternatively, the image map 150 may be retrieved from an input device such as a computer keyboard or mouse. In step 560, the processor 110 uses the mapping data to determine the image location for each matrix entry 210. The image location may comprise a single pixel or may comprise a region of the final image 140. For each matrix entry 210 that is mapped to a region or pixel of the final image 140, the color vector calculated for the matrix entry 210 is placed in the appropriate portion of the final image file 140. In step 580, the processor 110 transmits the final image 140 to a storage medium or an output device coupled to the processor 110. Method 500 ends.

Figure 6A:
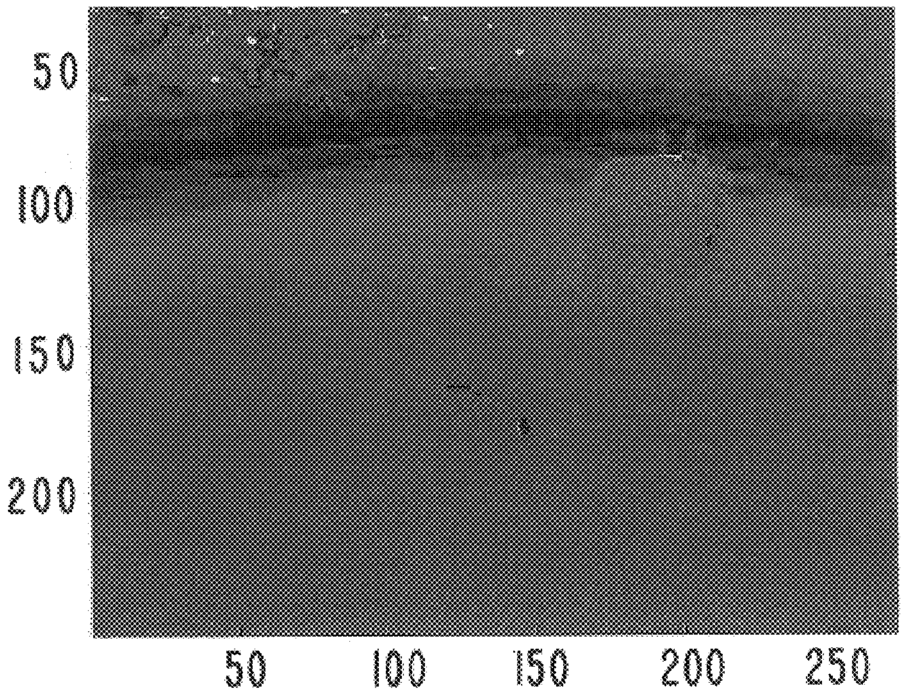
FIG. 6*a* provides a color image created by a prior art method
Figure 6B:
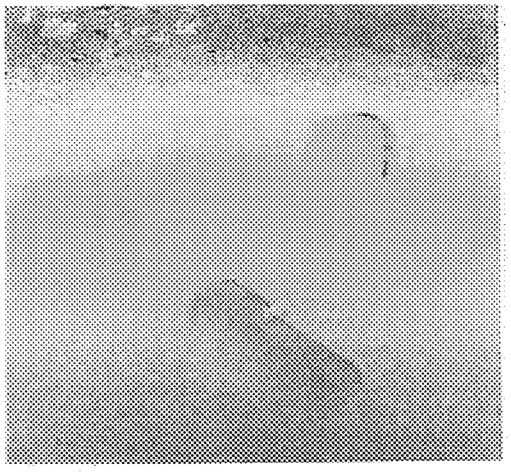
FIG. 6*b* provides a first color image created using the present invention.
Figure 6C:
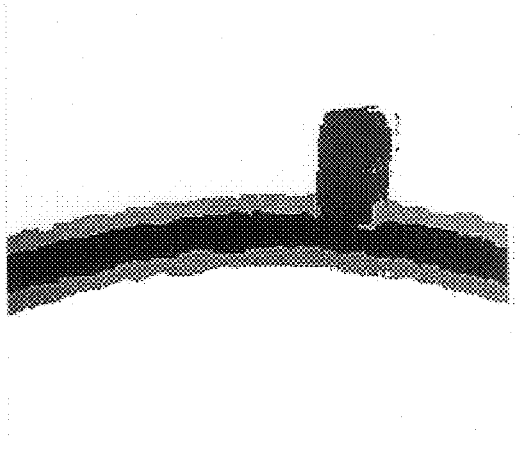
FIG. 6*c* provides a second color image created using the present invention.

Referring now to FIGS. 6*a*, 6*b*, and 6*c*, three images created using data coloration methods are shown. The images were created from a matrix 100 storing distance values between a visual input device and two objects in the image. The distances were calculated using stereo imaging techniques described above. The matrix 100 includes entries with values ranging from a few inches (objects at the base of the image) to several feet (objects at the top of the image).

Referring now to FIG. 6*a*, an image created from the matrix 100 using a standard data coloration method is shown. When colorizing data using this method, the software application searches for the lowest and highest data values in the matrix. The lowest value is assigned the first color of the colormap and the highest value is assigned the last color in the map. All of the intermediate values are assigned to a color that most closely approximates their position between the lowest and highest value. Since the matrix 100 contains a wide selection of values, including larger values representing objects such as a wall in the distance, the standard mapping technique creates a map with a large range of data values. In spite of the fact that the larger distant values may not be of interest to the user, a majority of the colors in the colormap are mapped to these larger distances. For example, if the objects of interest in the image are three feet away from the visual capture device and a wall in the distance is fifteen feet away, approximately eight percent of the values in the colormap will be mapped to the objects between three feet and fifteen feet away. In this example, the objects of interest are in the first three feet of the image yet those distance values will be mapped to a only few colors. The image also contains visual imparities that may have resulted from errors in data collection or color calculations. These errors further reduce the visibility in the image.

Referring now to FIG. 6*b*, a second image created using the present invention on the same matrix 100 is shown. The image was created using coloration parameters that matched color vectors to particular entry values. In this case, the first interval edge has a zero value (meaning zero distance away) and was assigned the red color vector, the second interval edge has a value of three and was assigned the yellow color vector, and the final internal edge has a value of 30 feet and was assigned the blue color vector. Contrary to the traditional method, the objects in the image can be seen very clearly. This is the result of the enhanced focus on the values of most interest in the image—in this case the three feet between the camera and the furthest object.

Referring now to FIG. 6*c*, a second image created using the present invention on the same matrix 100 is shown. The image was created using coloration parameters 120 that created fifteen intervals with each interval representing a single foot of distance. The leading and trailing edges of the first interval and the edges of intervals five through fifteen were assigned the white color vector. The edges of intervals two through four were assigned the black color vector. The gray areas of the image represent the transition between the edges of intervals one and two and the transition between the edges of intervals four and five. This method eliminates both the closest and farthest distance values enabling easier viewing and identification of the objects in the range of interest.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for creating a color image from a two-dimensional matrix, said method comprising the steps of:

retrieving matrix coloration parameters;

parsing the matrix into intervals, wherein each interval has a leading edge and a trailing edge corresponding to distinct matrix entries as defined by the coloration parameters;

assigning a color vector comprising at least one color coordinate to each of the leading edge and the trailing edge of each interval;

calculating a color vector for each matrix entry in an interval, wherein coordinates of the calculated color vector are interpolated from the coordinates of the color vectors at the leading edge and the trailing edge of the interval; and storing the color vectors corresponding to each of the matrix entries.

2. The method of claim 1, wherein the matrix coloration parameters are stored in a data file.

3. The method of claim 1, wherein the matrix coloration parameters are provided through a data input device.

4. The method of claim 1, wherein the matrix coloration parameters include a range for each of the intervals.

5. The method of claim 4, wherein the range of an interval comprises a range of data values.

6. The method of claim 4, wherein the interval ranges correspond to an equal number of matrix entries.

7. The method of claim 1, wherein the edges of the intervals correspond to specific matrix entries.

8. The method of claim 1, further comprising the steps of:

retrieving an image map of the matrix;

locating image region parameters in said image map;

calculating an image region for each matrix entry using the located image region parameters; and storing the color vector corresponding to each matrix entry in the corresponding image region.

9. The method of claim 8, wherein the image map is stored in a data file.

10. The method of claim 8, wherein the image map is provided through a data input device.

11. The method of claim 8, wherein the image region parameters comprise a mapping function.

12. The method of claim 11, wherein the mapping function calculates the image region using matrix coordinates of the entry in the matrix.

13. A method for locating objects in an image at a distance range from a device having visual input apparatus, said method comprising the steps of:

receiving a distance matrix comprising distance values, wherein the distance values stored in the matrix are the distances between the device and objects in an image generated by the visual input apparatus;

generating matrix coloration parameters, wherein the parameters include interval values corresponding to a start distance range and end of the distance range;

parsing the matrix into intervals, wherein the intervals include a distance interval having a leading and a trailing edge corresponding to the interval values comprising the start and end distance range values as defined by the coloration parameters;

assigning a color vector comprising at least one color coordinate to each of the leading edge and trailing edge of the distance interval;

calculating a color vector for each matrix entry in the distance interval, wherein coordinates of the calculated color vector are interpolated from the coordinates of the color vectors at the leading edge and the trailing edge of the distance interval; and creating an image from the color vectors calculated for each matrix entry in the distance interval, wherein the color vectors are stored in a region of the image corresponding to the location of the matrix entry in the distance matrix.

14. A computer-readable medium containing a computer program enabling a computer to create a color image from a two-dimensional matrix by performing the steps of:

retrieving matrix coloration parameters;

parsing the matrix into intervals, wherein each interval has a leading edge and a trailing edge corresponding to distinct matrix entries as defined by the coloration parameters;

assigning a color vector comprising at least one color coordinate to each of the leading edge and the trailing edge of each interval;

calculating a color vector for each matrix entry in an interval, wherein coordinates of the calculated color vector are interpolated from the coordinates of the color vectors at the leading edge and the trailing edge of the interval; and storing the color vectors corresponding to each of the matrix entries.

* * * * *